C. E. SUMMERS.
CARBURETER.
APPLICATION FILED NOV. 21, 1913.
1,177,216.
Patented Mar. 28, 1916.
5 SHEETS—SHEET 1.
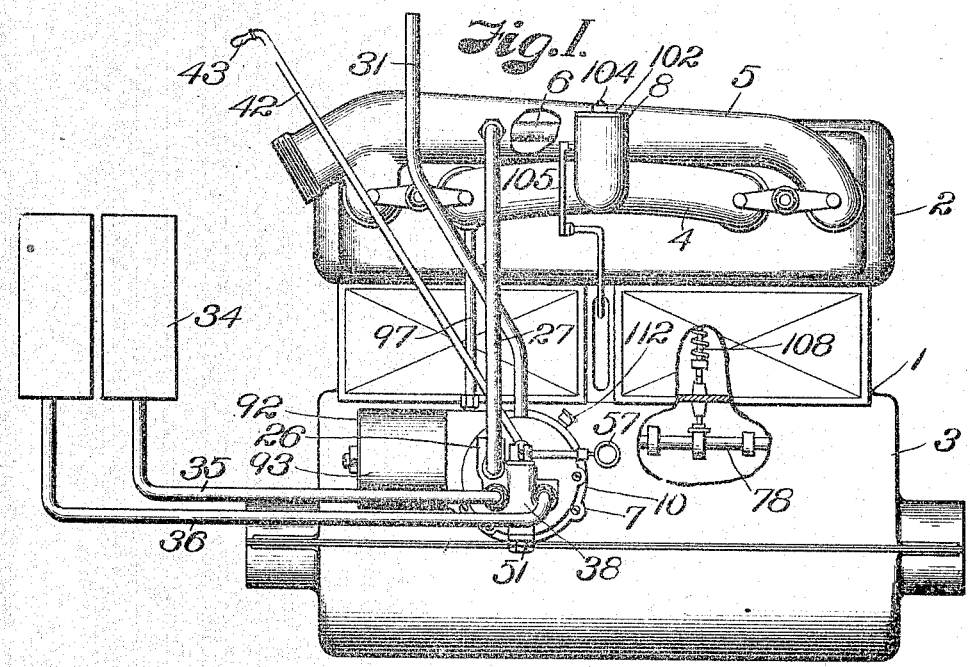
Fig. I.
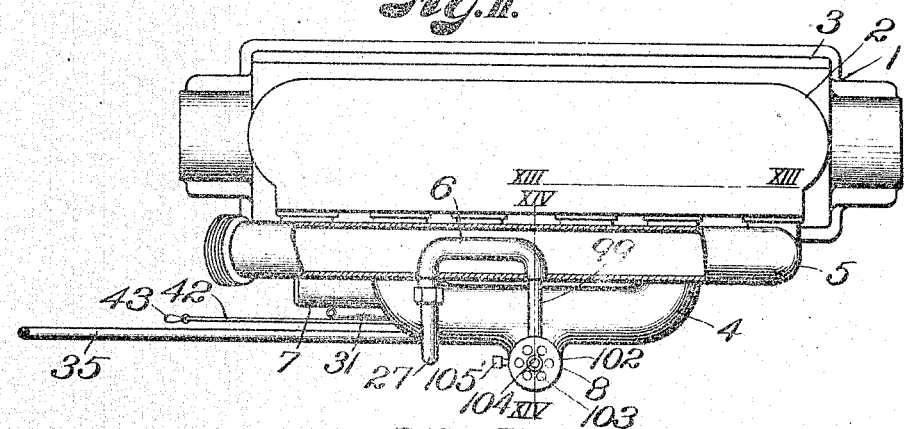
Fig. II.
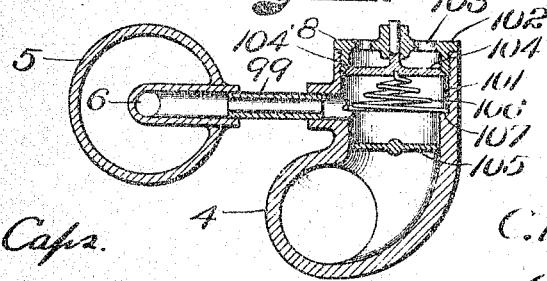
Fig. XIV.
WITNESSES:
Arthur W. Caps.
L. E. Coats.
INVENTOR
C. E. Summers.
BY
Arthur C. Brown
ATTORNEY

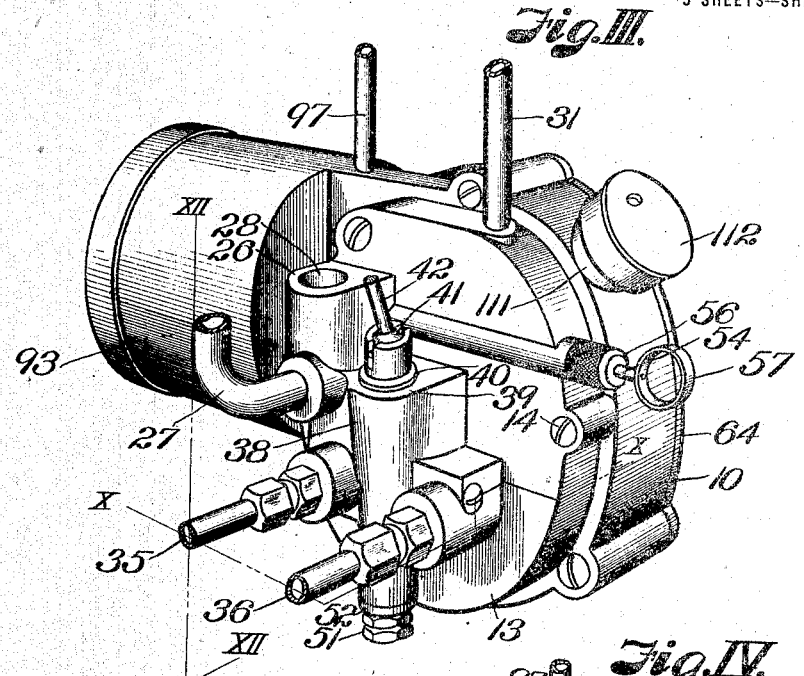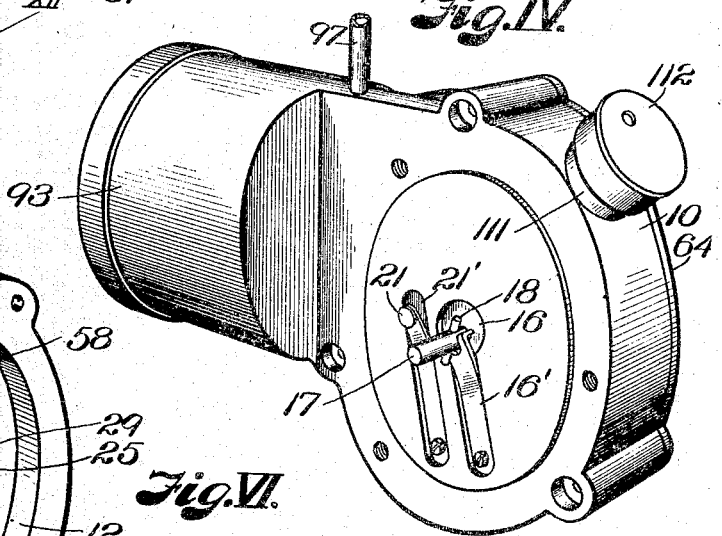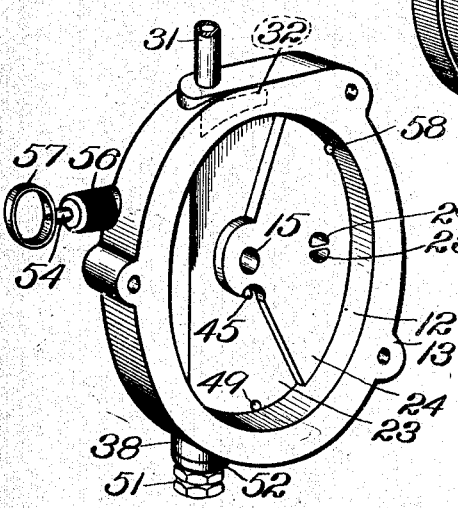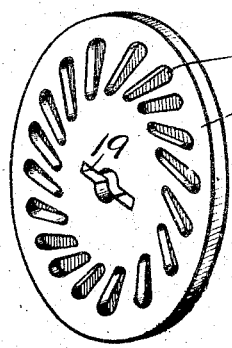

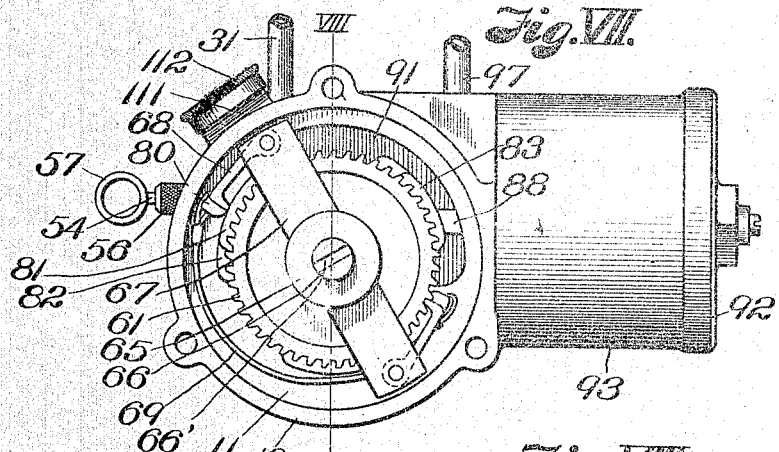
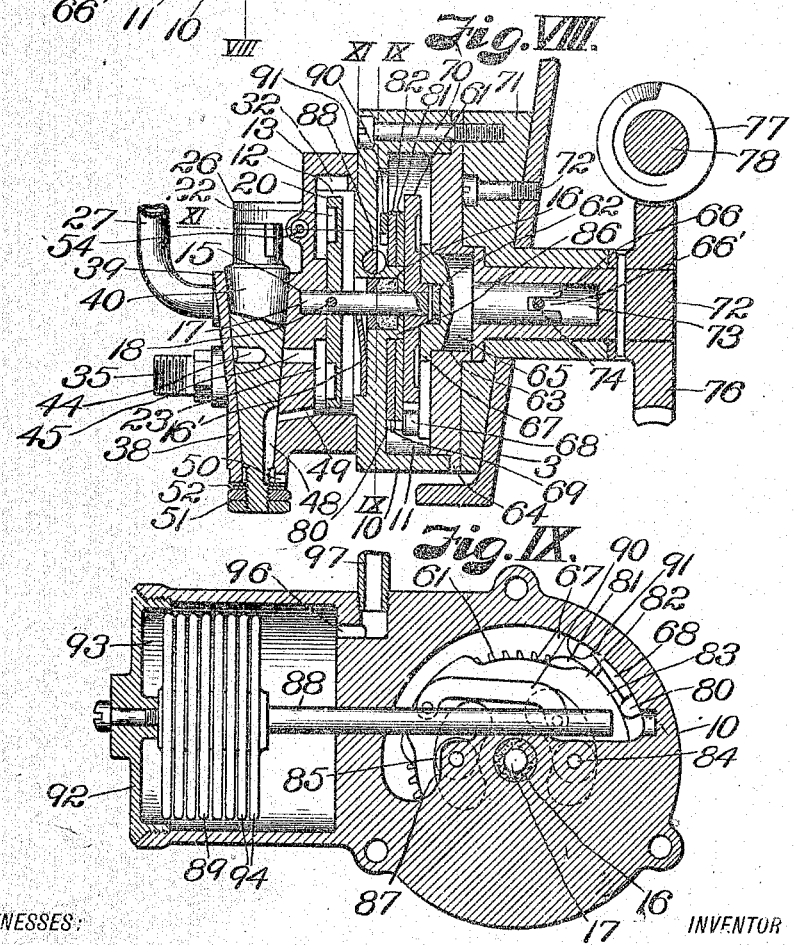

C. E. SUMMERS.
CARBURETER.
APPLICATION FILED NOV. 21, 1913.
1,177,216.
Patented Mar. 28, 1916.
5 SHEETS—SHEET 4.
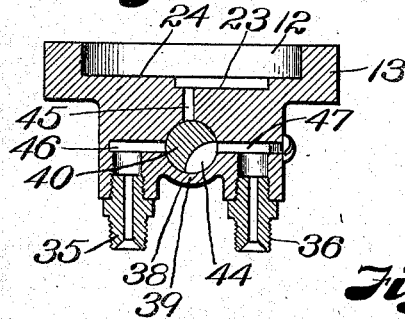
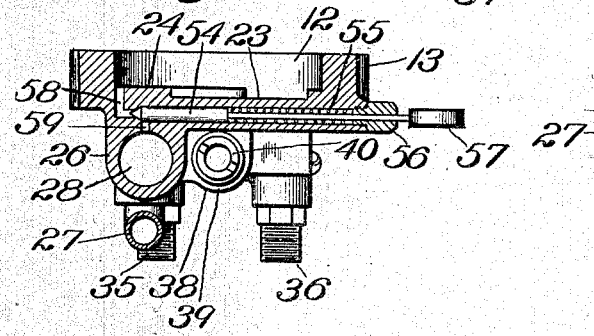
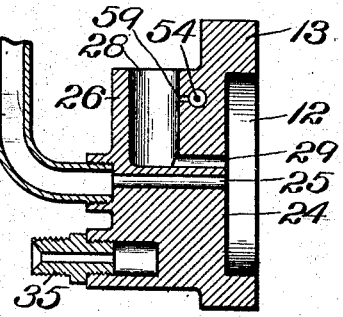
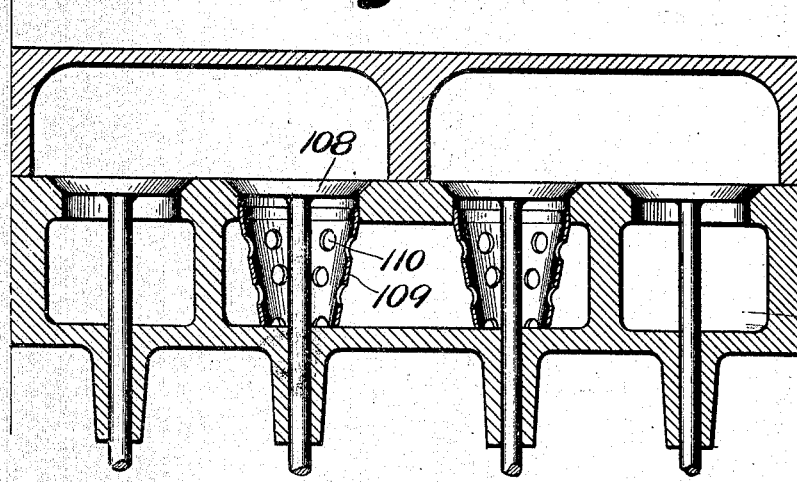
WITNESSES:
Arthur W. Caps.
L. E. Coats.
INVENTOR
C.E. Summers.
BY
Arthur C. Brown
ATTORNEY

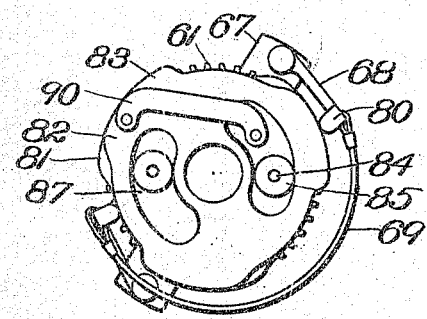
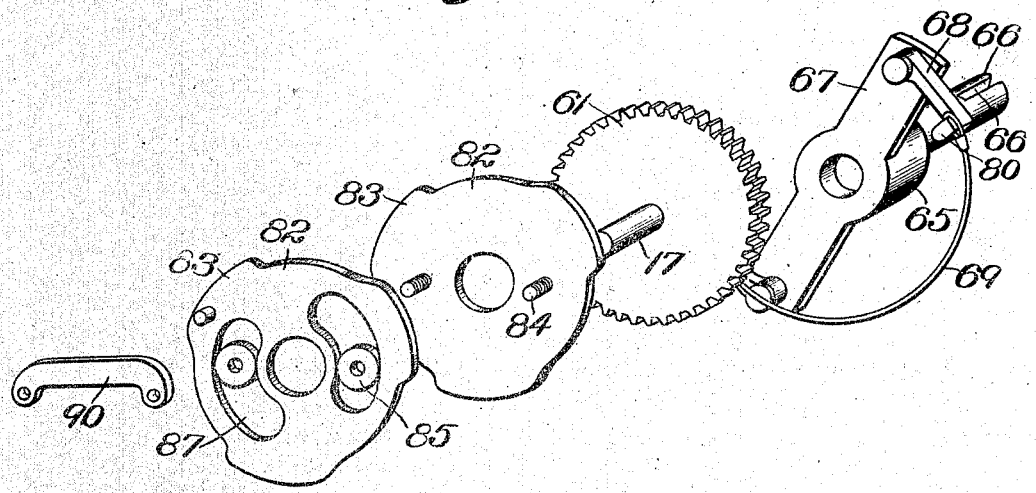

UNITED STATES PATENT OFFICE.

CALEB E. SUMMERS, OF KANSAS CITY, MISSOURI, ASSIGNOR TO LAURA A. SUMMERS, OF OAKTOWN, INDIANA.

CARBURETER.

REISSUED

1,177,216.   Specification of Letters Patent.   Patented Mar. 28, 1916.

Application filed November 21, 1913.   Serial No. 802,256.

*To all whom it may concern:*

Be it known that I, CALEB E. SUMMERS, a citizen of the United States, residing at Kansas City, in the county of Jackson and State of Missouri, have invented certain new and useful Improvements in Carbureters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to carbureters, and has for its principal object to provide a carbureter comprising a measuring element whereby fuel may be delivered to the cylinder of a motor in measured quantities, and whereby the volume of fuel is automatically regulated to meet the requirements of varying loads and speeds of the motor and varying temperatures and barometric pressures, the present invention constituting an improvement on that disclosed in my co-pending application, Serial Number 788,626, filed September 8, 1913.

It is also an object of the invention to provide a carbureter which is adapted for use, without alteration, with fuels of different specific gravity, and wherein one fuel, such as gasolene, may be used until the motor has been warmed and cheaper fuel then delivered to the carbureter through the same measuring element and mixer without interrupting the operation of the motor.

In accomplishing these objects I have provided a carbureter comprising a measuring device which is operable from the crank shaft of the motor with which the carbureter is used and is under control of a temperature and pressure regulator, so that the fuel feed is always proportioned to the speed of the motor and automatically variable to meet the requirements of the motor under different conditions of temperature or pressure in the intake manifold of the motor, or the surrounding atmosphere.

In particular, the invention comprises certain improved details of structure, the preferred forms of which are illustrated in the accompanying drawings, wherein:—

Figure I is a side elevation of a motor equipped with a carbureter, constructed in accordance with my invention. Fig. II is a plan view of the same, a portion of the exhaust manifold being in section. Fig. III is a perspective view of the measuring element of the carbureter. Fig. IV is a similar view with the fuel chamber head removed. Fig. V is a perspective view of the fuel chamber head. Fig. VI is a perspective view of the fuel measuring disk. Fig. VII is an elevation of the measuring element; the cover being removed to illustrate the driving mechanism for the measuring disk. Fig. VIII is a transverse sectional view on the line VIII—VIII, Fig. VII. Fig. IX is a longitudinal, sectional view on the line IX—IX, Fig. VIII, showing the diaphragm valve for automatically controlling the measuring element. Fig. X is a sectional view of the fuel chamber head, on the line X—X, Fig. III. Fig. XI is a sectional view of the same, on the line XI—XI, Fig. VIII. Fig. XII is a sectional view of the same, on the line XII—XII, Fig. III. Fig. XIII is a sectional view of the valve chambers of the motor cylinders, on the line XIII—XIII, Fig. II, showing a perforated cage around the inlet valve ports, for further mixing and vaporizing the fuel. Fig. XIV is a sectional view of the air valve and heater, taken on the line XIV—XIV, Fig. II. Fig. XV is a detail elevation of the driving members of the fuel measuring element, and their cam control. Fig. XVI is a perspective view of the parts in spaced relation.

Referring more in detail to the parts: 1 designates a motor of any suitable type, comprising a plurality of cylinders 2, mounted on a crank case 3 and having an intake manifold 4 and exhaust manifold 5. Located within the exhaust manifold 5 is a heater 6, preferably comprising a U-shaped tube; the ends of which communicate respectively with a fuel measuring device 7 and with a mixing valve 8, so that all fuel delivered from the measuring device must pass through the heater prior to its entrance into the mixing valve, and subsequently into the cylinders of the motor.

The measuring device comprises a casing 10, suitably mounted on the crank-case 3 of the motor, and inclosing a chamber 11 for containing driving mechanism, for operating the measuring elements, which latter are contained within a chamber 12 in the head 13 that is secured to the casing 10, preferably by screws 14. Revolubly mounted in a bearing 15 in the head 13, and in a stuffing box 16, in the casing 10, is a shaft 17, having key and slot connection 18—19 with a disk 20 which is held yieldingly against the inner face of the chamber 12 by a spring 21, and which is provided with a plurality of diagonally disposed pockets 22 in its outer face. The body of the spring 21 is located in a groove 21' in the outer face of the casing 10, and a spring 16', located in a similar and adjacent groove engages the stuffing box to yieldingly hold the latter in place. The disk 20 is adapted for travel past a cupped portion 23 of the chamber 12, so that liquid fuel contained therein may enter the pockets 22, and for travel past and in close contact with the raised portion 24, so that fuel may be trapped in the pockets and carried to an outlet port 25, located at about the center of the raised portion.

Integral with the head 13 is a boss 26, having a tube 27 threaded thereinto and communicating at its inner end with the outlet port 25, and at its outer end with the heater 6. The boss 26 also comprises an upwardly opening cup 28, having a port 29, opening through the head 13, adjacent the outlet port 25, so that suction from the intake manifold, with which the tube 27 is connected, may draw air from the open cup into the pockets in the measuring disk and displace the liquid from the pockets 22 as they register with the openings 25—29, in order that the fluid may be drawn by the suction into the heater tube and be conducted therethrough to the mixer and manifold. In order to relieve the disk chamber of air taken thereinto in this manner, I provide a vent tube 31 which communicates with a recess 32 in the upper portion of the chamber, and which extends upwardly to a point above the level of the supply tanks 34 (Fig. I).

The present device is particularly adapted for receiving two kinds of liquid fuel contained within supply tanks 34 which may be located at any convenient point, and conducted to a valve 38 on the head 12 by tubes 35 and 36. The valve 38 preferably comprises a seat 39, which is integral with the head 13, and contains a valve plug 40, having ball and socket connection 41 with a rod 42 which extends to a convenient point of control and is provided at its free end, with a handle 43. The valve plug 40 is provided with a ninety degree slot 44, which is adapted for simultaneous communication with a port 45 leading to the measuring chamber, and with either one of the conduits 46 or 47 that communicate with the fuel supply tubes 35—36 respectively, so that liquid fuel from either of the tanks 34 may flow separately into the measuring chamber.

If the engine has been operating on the fuel from one of the supply tanks and it is desired to change and use fuel from the other tank, which may be of a different kind or grade, it is necessary to drain the measuring chamber before the new fuel is introduced. In accomplishing this function, I have provided the valve plug 40 with a longitudinal slot 48 (Fig. VIII), which is adapted for communication with an aperture 49 in the head 13 and with a notch 50 in the base of the valve seat 39, when the slot 44 is out of communication with both of the feeding conduits, so that when the conduits 46 and 47 are closed, the port 49 is open, to drain the measuring chamber. The valve plug 40 is also provided with lock nuts 51 and a spring washer 52 for holding it snugly to its seat while allowing free revoluble movement to its various positions.

Near the upper portion of the head 13 is a priming device comprising a needle valve 54 which is held to its seat by means of a coil spring 55, and passes through a retaining nut 56. The needle valve is provided with a finger grip 57 and is adapted to normally close a port 58 in the measuring chamber 12, so that the liquid fuel will not flow therethrough, and through an aperture 59 which communicates with the cup 28 unless the valve 54 is opened, in which case the cup 28 will fill with the liquid fuel and flow through the port 29 and into the discharge conduit to deliver a greater quantity of fuel to the engine cylinders, and hence a richer mixture at the start.

The actuating mechanism for revolving the feeding disk 20 comprises a ratchet wheel 61 rigidly mounted on the shaft 17 and within the chamber 11. Revolubly mounted on the hub 62 of the ratchet wheel 61 and in an aperture 63 in the cover 64 of the chamber 11, is a hub 65, having a slotted shank 66 and having diametrically extending arms 67. Pivotally mounted near the extremity of each of the arms 67 is a pawl 68, which is held yieldingly in engagement with the ratchet wheel 61 by a curved spring 69, the opposite ends of which are mounted on respective pawls.

The casing 10 is held to the crank case 3 by screws 70, which pass through the casing and cover 64 and are threaded into a spacing block 71 which is, in turn, secured to the crank-case by screws 72.

Revolubly mounted in the block 71 is a shaft 72, having a socket 73 into which the slotted shank 66 is projected; the end of the shank having a transverse slot 66' in its end adapted for receiving a pin 74, that extends across the socket, so that the shank may be revolved with the shaft 72. Fixed on the inner end of shaft 72 is a worm gear 76 which meshes with a worm 77 on the cam-shaft 78 of the motor, so that the arms 67, upon which the ratchet pawls 68 are mounted, are revolved at a speed directly proportional to the speed of the cam and motor shafts.

Each of the pawls 68 is provided with a laterally projecting lug 80 which lies in the path of a pair of cams 81 and 82 whose outer contour is similar, in that they are each provided with three equally spaced cam surfaces 83 for simultaneously engaging the lugs 80 to hold the pawls out of engagement with the ratchet wheel 61, the cam 81 being rigidly mounted on the inner face of the chamber 11 by screws 84 and spacing collars 85, and the cam 82 revolubly mounted on the boss 86 of the casing 10. The cam 82 is provided with two arcuatile slots 87 into which the spacing collars 85 are projected to guide and limit the travel of the cam, and the latter is operatively connected with the rod 88 of a pressure regulator 89 by a link 90, which, with the link, is located in a cut-out portion 91 of the head 13. The pressure regulator 89 is secured to the cap 92 of, and is contained within, the chamber 93 in the casing 10, and comprises a plurality of intercommunicating diaphragms 94 which are sealed *en masse* and are adapted to operate in unison to reciprocate the rod 88 and oscillate the cam 82 whenever the change of barometric or absolute pressure, or temperature in the chamber 93, causes the air within the diaphragms to expand or contract.

Leading from the chamber 93 is a conduit 96, having a tube 97 which communicates with the intake manifold 4, so that variation in pressure due to throttling the engine is communicated directly to the chamber 93 and causes the diaphragm to expand or contract and thereby oscillate the cam 82. The effect of this oscillating movement is to rock the link 90 and turn the free cam 82 on the stationary cam 81, and thereby increase or diminish the amount of effective cam surface over which the lugs 80 of the pawls 68 travel, and consequently the length of time the ratchet pawls are in contact with the ratchet wheel 61.

It is apparent that by using the worm gear drive, the pawl carrying arms 67 are driven constantly when the cam shaft is active, and that the pawls impart an intermittent revoluble movement to the ratchet wheel and measuring disk, by virtue of their contact with the cams 81 and 82. It is also apparent that the regulator 89 determines the magnitude of such intermittent motion and that when the engine throttle is closed and the absolute pressure in the intake manifold diminished, the absolute pressure in the chamber 93 will likewise be diminished and the interval in which the pawls are in engagement with the ratchet wheel lessened, to reduce the speed of the measuring disk and check the flow of fuel, until the engine speed has been reduced sufficiently to increase the absolute pressure in the intake manifold and permit the measuring disk to revolve at a speed more nearly approaching its normal ratio with the single consumption.

As any increase in temperature or decrease in barometric pressure in the surrounding atmosphere causes the diaphram to expand and cut down the revolution of the measuring disk, the minimum amount of fuel for operating the motor is delivered from the feeding chamber, and waste of fuel is thereby obviated.

After the liquid fuel has passed into the delivery conduit, it passes through the heater 6 and through a tube 99 into a mixing valve 8, which is integral with the intake manifold 4 and comprises a vertical chamber 101, having a cap 102 threaded into its upper end and provided with a plurality of apertures 103. Slidably mounted in the cap 102 is a puppet valve 104, which is held yieldingly to a seat 104' on the lower portion of the cap by a conical shaped spring 106, which bears against the center of the valve and against a shoulder 107 in the chamber 101. The fuel vapor enters the chamber 101 beneath the valve 104 and passes downwardly through a throttle valve 105 which is pivotally mounted in the sides of the chamber and is provided with an ordinary lever 105'' that is operable from any convenient point of control.

As the fuel vapor enters the chamber 101 it is mixed with its complement of air and passes through the downwardly inclined portions of the intake manifold and through the inlet valves 108 of the motor. In order to more thoroughly mix the gases and prevent fuel from entering the cylinders before it has been vaporized, I provide each cylinder valve with a cone-shaped hood 109, which is fixed within the valve chamber of the cylinder immediately adjacent the valves 108, and has apertures 110 therein through which gas must pass to enter the cylinder.

As it is sometimes desirable to inspect the driving mechanism during its operation, I have provided the casing 10 within a sight tube 111, through which the parts within the casing may be observed, and which may be closed under normal conditions by a cap 112.

In using the device, presuming the parts to be assembled as described, and the tanks 34 filled with gasolene and kerosene respectively, the handle 43 is actuated to turn the valve plug 40 to position for admitting gasolene to the measuring chamber, and the engine cranked in the ordinary manner. When the motor has started and is running on its own power, the worm 77 on the cam shaft 78 imparts revoluble movement to the worm gear 76 and arms 67 on which the pawls 68 are mounted, so as to carry the latter over the peripheral face of the ratchet wheel 61 and over the cams 81 and 82, so that the pawls will alternately engage the ratchet wheel and turn it through an arc, the length of which is determined by the position of the cams, the effective position of the cams being dependent on the temperature and pressure within the regulator 89, which varies with the temperature and pressure of the surrounding atmosphere and with the absolute pressure in the intake manifold and, in the initial condition of the motor, holds the cams so that the ratchet pawls impart a very slight movement to the ratchet wheel. The measuring disk being operatively connected with the ratchet wheel, is carried therewith, and the pockets 22 are filled with gasolene as they pass the cupped portion 23 of the head 13, and the gasolene is trapped in said pockets as the disk moves over the raised portion 24 and is carried upwardly to the ports 25—29.

The operation of the motor causes a partial vacuum to be formed in the intake manifold, which is communicated to the port 25 through the tube 27, so that the fluid is removed from the pockets and displaced with air which enters through the port 29. Suction from the intake manifold draws the liquid fuel through the tube 27 into the heater 6, where it is vaporized by exhausting gases and delivered into a tube 99 in the form of vapor. This vapor is then delivered into the chamber 101 and mixed with air from the valve 104, to form proper fuel mixture, which is delivered into the engine cylinder through the screen 109 and valves 108. Under such conditions and with the throttle open, the absolute pressure in the intake manifold increases and the diaphragm will contract, thereby moving the cam 82 more nearly into alinement with the cam 81, and permitting the pawls a longer contact with the ratchet wheel, and consequently a greater number of revolutions of the measuring disk, giving an increased supply of gasolene to the cylinders. As soon as the motor has become well heated, the handle 43 is manipulated to close the gasolene port leading from the kerosene supply tank, in which position the parts operate as just described, but with kerosene instead of gasolene as the fuel fluid.

When the motor is to be started, after having run on kerosene, the measuring chamber may be drained of the heavier liquid before the gasolene is turned in, by turning the valve 40 until the groove 48 registers with the aperture 49, in which position of the valve the liquid fuel will flow through the notch 50 until the chamber is empty, it being apparent that as the groove lies in the third quarter of the valve's circumference both supply conduits will be closed during the draining operation.

It is sometimes necessary, during cold weather, to furnish a richer mixture to the cylinders for starting the engine, and in accomplishing this function I have provided the priming valve 54, which may be actuated to permit liquid fuel to flow from the measuring chamber into the opening 28 from which it is drawn by suction into the motor.

Having thus described my invention, what I claim as new therein, and desire to secure by Letters-Patent, is:—

1. The combination with a motor comprising a cylinder and a cam shaft, of measuring mechanism comprising a disk having fuel pockets therein, a ratchet wheel operatively connected with the disk, a pawl carrying member revolubly mounted adjacent the ratchet, a shaft operatively connected with said pawl carrying member, and gears on said shaft and on the cam shaft for imparting continuous rotary movement to said pawl carrying member.

2. In an apparatus of the character described, a fuel measuring mechanism comprising a fuel chamber having a delivery port, a disk revolubly mounted in the chamber and having pockets therein adapted for travel past the delivery port, a ratchet wheel connected with said disk, a shaft mounted concentrically with said disk and ratchet wheel, arms extending laterally from said shaft, pawls pivotally mounted on said arms and yieldingly tensioned toward operative engagement with the ratchet wheel, and gearing for continuously rotating said shaft.

3. In an apparatus of the character described, a fuel measuring mechanism comprising a fuel chamber having an outlet port and having a cupped portion provided with an intake port, a disk revolubly mounted in said chamber and having pockets adapted for travel through the cupped portion of the chamber and over the outlet port, a ratchet wheel operatively connected with said disk, pawl arms and means for actuating same, pawls mounted on said arms and adapted for operative engagement with the ratchet wheel, and a cam for disconnecting the pawls from said ratchet wheel.

4. In an apparatus of the character described, a fuel measuring mechanism comprising a fuel chamber having an outlet port and having a cupped portion provided with an intake port, a disk revolubly mounted in said chamber and having pockets adapted for travel through the cupped portion of the chamber and over the outlet port, a ratchet wheel operatively connected with said disk, pawl arms and means for actuating same, pawls mounted on said arms and adapted for operative engagement with the ratchet wheel, and a variable cam member adapted for automatic adjustment for determining the driving relation of the pawls to said ratchet wheel.

5. An apparatus of the character described comprising fuel measuring mechanism, means for driving said mechanism and a regulator operatively connected with said driving mechanism and adapted for actuation by varying atmospheric temperatures and pressures to vary the operation of the fuel measuring mechanism.

6. An apparatus of the character described comprising liquid fuel measuring mechanism, means for imparting rotary movement to said mechanism and an atmospheric regulator operatively connected with said measuring mechanism and adapted for intermittently arresting its rotary movement.

7. An apparatus of the character described, comprising liquid fuel measuring mechanism, a ratchet mechanism for imparting intermittent rotary movement to said measuring mechanism, means for imparting continuous rotary movement to said ratchet mechanism; and a regulator operable by varying pressure or temperature for varying the effective engagement of said ratchet mechanism and said measuring mechanism.

8. An apparatus of the character described, comprising a casing having fuel and operating chambers, a shaft revolubly mounted in said casing and extending through said chambers, a disk secured to said shaft within said fuel chamber, a ratchet wheel secured to said shaft within said operating chamber, a drive shaft revolubly mounted in said casing, diametrically extending arms on said drive shaft within the operating chamber and adjacent said ratchet wheel, a pawl pivotally mounted on each of said arms, and a spring yieldingly tensioning said pawls toward said ratchet wheel and means for imparting continuous rotary movement to said drive shaft.

9. An apparatus of the character described, comprising a casing having fuel and operating chambers, a shaft revolubly mounted in said casing and extending through said chambers, a stuffing box for said shaft between said chambers having a projecting hub, a liquid measuring disk secured to said shaft within said fuel chamber, a ratchet wheel secured to said shaft within said operating chamber, a cam centrally mounted on said stuffing box hub and rigidly secured to said casing, a similar cam movably mounted on said hub, a regulator adapted for actuation by varying temperatures or pressures, a drive shaft revolubly mounted in said casing, diametrically extending arms on said drive shaft, pawls on said arms adapted to engage said ratchet wheel, laterally directed bosses on said pawls adapted for engaging said cams, and a link connecting said movable cam with said regulator whereby the effective contact of the pawls with the ratchet wheel is governed by the regulator.

10. An apparatus of the character described, comprising a casing having a fuel chamber, an operating chamber and a regulator chamber, a liquid measuring device in said fuel chamber, mechanism in said operating chamber for intermittently actuating said liquid measuring device, and an atmospheric regulator in said regulator chamber adapted for determining the intermittent actuation of said mechanism.

11. An apparatus of the character described, comprising a casing having a fuel chamber, an operating chamber and a regulator chamber, a shaft revolubly mounted in said casing and projecting through said fuel and operating chambers, a measuring disk on said shaft within said fuel chamber, a ratchet wheel on said shaft within said operating chamber, a drive shaft revolubly mounted in said casing, diametrically extending arms on said drive shaft extending into said operating chamber, pawls pivotally mounted on said arms, a spring for yieldingly holding said pawls in contact with said ratchet wheel, a laterally projecting lug on each of said pawls, a cam rigidly mounted within said operating chamber adjacent said ratchet wheel, having cam heads projecting beyond the periphery of said ratchet wheel and adapted for engaging the laterally projecting pawl lugs, a cam movably mounted within said operating chamber adjacent said stationary cam and adapted for engaging said pawl lugs, a regulator secured within said regulator chamber and adapted for expansion or contraction by varying temperature, barometric pressure or local pressure, a shaft on the free end of said regulator projecting into said operating chamber, and a link connecting said regulator shaft with said movable cam whereby the effective limit of actuation of said feeding mechanism is determined by the variations of said regulator.

12. An apparatus of the character described, comprising a casing, a head on said casing having a plurality of fuel inlet ports and a liquid fuel measuring chamber, liquid measuring elements in said chamber, a valve for connecting any one of said fuel inlet ports with said liquid fuel chamber, and means for draining said chamber.

13. An apparatus of the character described, comprising a casing, a head on said casing having a plurality of fuel inlet ports, a liquid fuel measuring chamber having an inlet port and a drain port, liquid fuel measuring elements in said fuel chamber, a valve in said head adapted for connecting any one of said fuel inlet ports with the inlet port of said fuel chamber, and for closing and opening the drain port.

14. An apparatus of the character described, comprising a casing, a head on said casing having a plurality of fuel inlet ports, a liquid fuel measuring chamber having an inlet port and a drain port, liquid measuring elements in said fuel chamber, and a valve in said head adapted to close all of said fuel inlet ports and open said drain port to drain the chamber.

15. An apparatus of the character described, comprising a casing, a head on said casing having a liquid fuel measuring chamber, a cup and a fuel delivery conduit; fuel measuring elements in said fuel chamber adapted to deliver fuel to said delivery conduit, and a priming valve connecting said fuel chamber with said cup.

16. An apparatus of the character described, comprising a casing, a head on said casing having a liquid fuel measuring chamber, a fuel delivery port and an external cup having a port communicating with said fuel chamber adjacent said delivery port; a fuel measuring disk in said fuel chamber having a plurality of pockets for delivering liquid fuel to said delivery port, means for producing suction through said delivery port, whereby fuel is drawn from the pockets and displaced by air through the cup port, and a spring-pressed valve connecting said cup with said chamber independently of said cup port whereby liquid fuel is permitted to fill said cup and displace the fuel drawn from said pockets into the delivery port, for the purpose set forth.

17. The combination with a motor having suitable exhaust and intake manifolds, of a carbureter comprising a casing having a fuel chamber, an operating chamber and a regulator chamber, liquid measuring elements in said fuel chamber, a driving mechanism in said operating chamber, a regulator in said regulator chamber for determining the effective engagement of said operating mechanism and measuring device, a heater in said exhaust manifold, a conduit communicating with said heater and fuel chamber and adapted for receiving liquid fuel from said measuring elements, a mixing valve in said intake manifold, an air inlet valve in said mixing valve, a conduit connecting said heater with said mixing valve, and a throttle for controlling the flow of fuel and air through said intake manifold.

ber and a regulator chamber, liquid measuring elements in said fuel chamber, an actuating mechanism in said operating chamber, a heater in said exhaust manifold, a conduit communicating with said heater and with said fuel chamber, a regulator in said regulator chamber for determining the effective connection between said actuating mechanism and said measuring elements, a conduit connecting said regulator chamber with said intake manifold, a mixing valve in said intake manifold, a conduit connecting said heater with said mixing valve, an air inlet valve in said mixing valve, and a throttle in said intake manifold for controlling the flow of gas through said manifold and varying the absolute pressure in said manifold and regulator chamber to vary the amount of liquid fuel delivered by said measuring elements.

19. The combination with a motor having a cam shaft and suitable exhaust and intake manifolds, of a carbureter comprising a casing having a fuel measuring chamber, an operating chamber and a regulator chamber, liquid measuring elements in said fuel chamber, a mixing valve in said intake manifold, a discharge conduit connecting said mixing valve and said fuel chamber, an actuating mechanism in said operating chamber, a drive shaft for said actuating mechanism, a worm gear on said drive shaft, and a worm on said cam shaft for turning said worm gear and driving said actuating mechanism and a regulator in said regulator chamber for governing the effective connection between said actuating mechanism and said measuring elements.

20. The combination with a motor having a cam shaft and suitable exhaust and intake manifolds, of a carbureter comprising a casing having a fuel measuring chamber an operating chamber and a regulator chamber, liquid measuring elements in said fuel chamber, a mixing valve in said intake manifold, a conduit for conducting fuel from said fuel chamber to said mixing valve, a throttle in said intake manifold between the motor and mixing valve, an actuating mechanism in said operating chamber for actuating said measuring elements, driving mechanism operatively connected with said cam shaft for driving said actuating mechanism in direct proportion to the speed of the motor, a conduit connecting said regulator chamber with said intake manifold, whereby the variations in absolute pressure of the intake manifold are communicated to the regulator chamber, a regulator in said a cam shaft, a plurality of cylinders, each having a valve chamber, inlet valves, and exhaust and intake manifolds, of a carbureter having a liquid fuel measuring device operable from the cam shaft and regulable by absolute pressure within the intake manifold, a mixing valve in said intake manifold, and a screen in said valve chamber surrounding said intake valve, whereby non-vaporized fuel is held by capillary attraction until atomized by the passing volume of gas.

22. An apparatus of the character described, comprising a fuel chamber having an inwardly directed boss provided with fuel delivery and air inlet ports, a shaft revolubly mounted in said chamber, a disk operatively connected with said shaft and having a plurality of fuel pockets adapted for travel past the fuel delivery and air inlet ports, and means for producing suction in said delivery ports, whereby the fuel in said fuel pockets is displaced by air from said air inlet ports.

23. An apparatus of the character described, comprising a fuel chamber having an air vent and having an inwardly directed boss provided with fuel delivery and air inlet ports, a disk revolubly mounted in said fuel chamber and having a plurality of fuel pockets adapted for travel past the fuel delivery and air inlet ports, means for producing suction in said fuel delivery ports for displacing the fuel in said fuel pockets with air from said air inlet ports, and means for revolving said disk to discharge the air thus acquired through said air vent.

In testimony whereof I affix my signature in presence of two witnesses.

CALEB E. SUMMERS.

Witnesses:
ARTHUR W. CAPS,
LETA E. COATS.